(No Model.)

C. C. PECK & W. H. CHAPMAN.
ELECTRIC MOTOR.

No. 279,008. Patented June 5, 1883.

Witnesses:
Walter E. Lombard.
E. A. Hemmenway.

Inventors:
Charles C. Peck,
William H. Chapman,
by N. C. Lombard
Attorney.

N. PETERS, Photo-Lithographer, Washington, D. C.

United States Patent Office.

CHARLES C. PECK AND WILLIAM H. CHAPMAN, OF MIDDLEBURY, VT.

ELECTRIC MOTOR.

SPECIFICATION forming part of Letters Patent No. 279,008, dated June 5, 1883.

Application filed January 15, 1883. (No model.)

*To all whom it may concern:*

Be it known that we, CHARLES C. PECK and WILLIAM H. CHAPMAN, both of Middlebury, in the county of Addison and State of Vermont, have invented jointly certain new and useful Improvements in Electric Motors, of which the following, taken in connection with the accompanying drawings, is a specification.

Our invention relates to that class of electric motors in which an armature is arranged to rock or roll bodily from one magnetic field to another in actual contact with the pole-pieces of the magnets and the non-magnetic filling-pieces interposed between said pole-pieces; and is an improvement upon the invention patented to us December 19, 1882; and it consists, essentially, of a system composed of two or more magnets, permanent or electro, and another system composed of a like number of soft-iron armatures wound with suitable conducting-coils, the members of one system being arranged to rock or roll upon or in contact with the members of the other system, and to be so moved relative thereto that each member of both systems is constantly exerting both an attractive and a repulsive force—*i. e.*, each member of each system will attract one member and repel another member of the other system.

It further consists in certain novel constructions, arrangements, and combinations of parts, which will be best understood by reference to the description of the drawings, and to the claims to be hereinafter given.

In the accompanying drawings, forming a part of this specification, we have illustrated our invention as embodied in a machine having two electro-magnets and two soft-iron armatures provided with electric coils, in which drawings—

Figure 1:
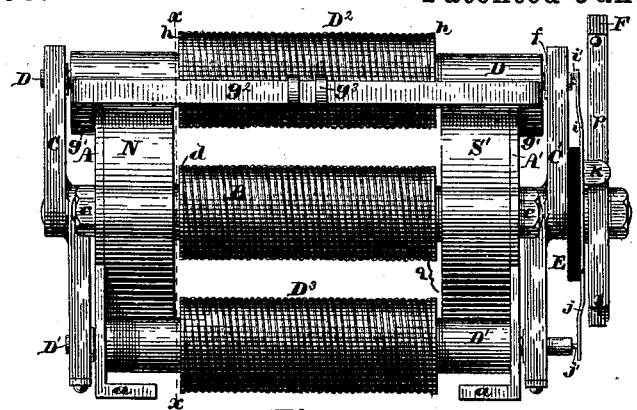
Figure 3:
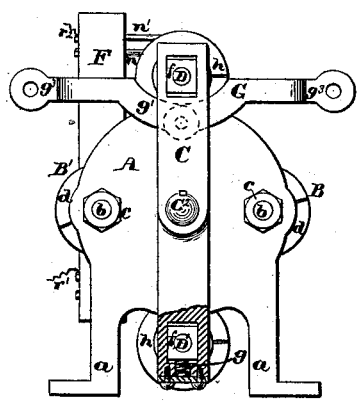
Figure 2:
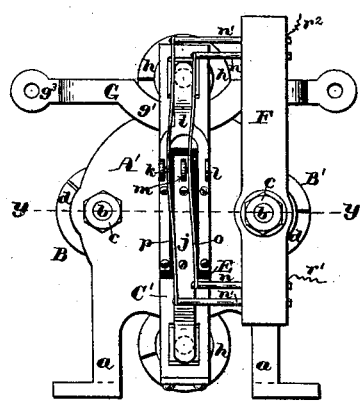
Figure 7:
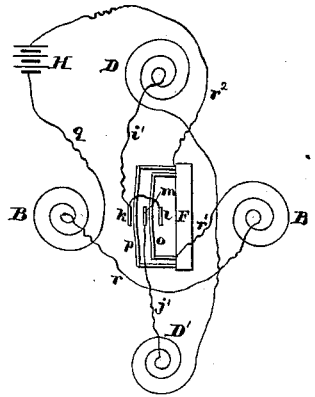
Figure 4:
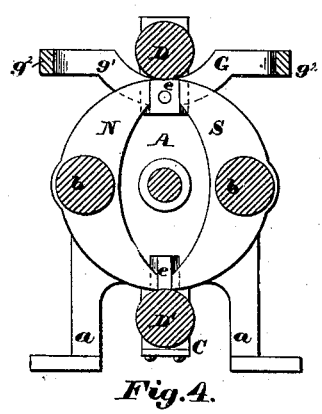
Figure 5:
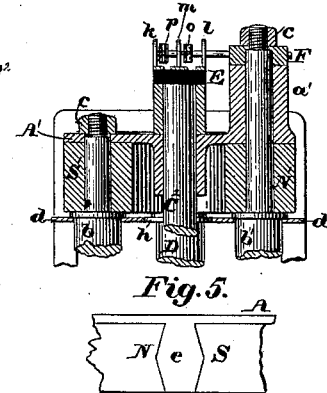
Figure 6:
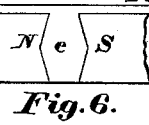

Figure 1 is a side elevation; Fig. 2, an end elevation; Fig. 3, an elevation of the opposite end. Fig. 4 is a vertical section on line $x\ x$ on Fig. 1, looking toward the left. Fig. 5 is a partial horizontal section on line $y\ y$ on Fig. 2, looking upward. Fig. 6 is a partial plan of one of the side frames, two pole-pieces, and the non-magnetic filling-piece; and Fig. 7 is a diagram illustrating the electric circuit.

A and A' are two brass end frames provided with suitable feet, $a\ a$, to support them in upright positions, and connected together by the cores $b$ and $b'$ of the magnets B and B', said cores having shanks or reduced portions formed upon their ends, which pass through the crescent-shaped pole-pieces N, S, N', and S', and through the frames A and A', and have fitted thereto suitable binding-nuts, $c\ c$, as shown. Each of the cores $b$ and $b'$ has fitted thereon two brass collars, $d\ d$, constructed and applied in the same manner as described in another application of ours of even date, and has wound thereon between said collars a coil of conducting-wire. The pole-pieces N, N', S, and S' are secured by the middle of their lengths to the ends of the cores $b$ and $b'$, and are so shaped and arranged that the ends of two opposing pole-pieces approach each other, and are separated by filling-pieces $e\ e$, of brass or other non-magnetic material, cast with or secured to the frames A and A', as shown in Figs. 4 and 6.

C and C' are two levers mounted by their centers upon the shaft $C^2$, which has its bearings in the centers of the frames A and A', and provided at each end thereof with a sliding box, $f$, in which are mounted, so as to revolve therein, the two soft-iron armatures D and D', arranged, respectively, above the upper ends and below the lower ends of the pole-pieces N, S, N', and S', as shown. The pole-pieces are so shaped that the outer surfaces of their upper and lower portions are concentric with the axis of the shaft $C^2$, and the armatures D and D' are so constructed and arranged that their end portions rest upon and roll in contact with said pole-pieces and the filling-pieces $e\ e$, the armature D resting thereon by its own weight, and the armature D' being pressed upward thereto by the coiled springs $g$, set in the arms or levers C and C', beneath the boxes $f$, as shown in Fig. 3. Each of the armatures D and D' has secured thereon two brass collars, $h\ h$, constructed and applied thereto in the same manner as described in our other application before referred to, and said armatures have wound thereon the coils $D^2$ and $D^3$, respectively, said coils being confined between the collars $h\ h$, as shown.

To the outer surface of the lever C', near the middle of its length, is secured the rectangular bar of hard rubber, E, in such a manner as to insulate from the frame of the machine the brass spring-plates $i$ and $j$, secured to the outer side thereof, as shown in Figs. 1 and 2. The spring-plates $i$ and $j$ project, respectively, above and below the rubber insulating-bar E, and bear at their free ends upon the wires $i'$ and $j'$, set in the ends of the armatures D and D', respectively, but insulated therefrom, said wires $i'$ and $j'$ being connected at their inner ends with the inner ends of the coils $D^2$ and $D^3$, respectively.

To the outer surface of the spring-plate $i$ are secured the two contact-ears $k$ and $l$, and to the outer face of the spring-plate $j$ is secured the middle contact-ear, $m$, said contact-ears being located to one side of the axis of motion of the levers C and C', so that they partake of the vibratory movement of said levers.

One of the shanks of the core $b'$ of the magnet B' is made of considerably greater length than the others, so as to extend through the long hub $a'$, formed upon the outer side of the frame A', and through the commutator-bar F, of hard rubber, which is clamped in a fixed position thereon by the binding-nut $e$, all as shown in Fig. 5.

The bar F has set therein the rods $n$ $n$ and $n'$ $n'$, to the ends of which are connected, respectively, the commutator-springs $o$ and $p$, substantially in the same manner as described in another application, by one of the parties hereto, of even date herewith.

G is a rectangular frame pivoted by the center of its end bars, $g'$, to the frames A and A', near their upper ends, or in such a position that the central portions of the upper surfaces of said end bars shall bear such a relation to the upper surfaces of the pole-pieces and the filling-pieces inserted between them, and in such positions relative to the armature D, as to be acted upon thereby to vibrate it about its pivots as said armature rocks or rolls from one magnetic field to another, moving in a path concentric to the axis of the levers C and C'.

The two side bars, $g^2$, of the frame G are provided at or near the middle of their lengths with the ears $g^3$, as a means of attaching thereto one or more connecting-rods, or other means of transmitting motion to a pump or other mechanism.

The central portions of the bars $g'$ of the frame G may be curved in the reverse direction to the curves of the pole-pieces, as shown; or they may be straight or curved in the same direction as the curve of said pole-pieces, but to a greater radius, and operate to produce substantially the same result in principle—viz., vibrating said frame about its pivotal axis by virtue of the direct pull of the attractive force of the magnets upon the soft-iron armature as said armature is rolled from one magnetic field to another and back again, the different conditions named only tending to vary the stroke of the frame G without changing the principles of its operation.

The several parts of the apparatus are connected electrically as follows: The outside end of the coil of the magnet B is connected by the wire $q$ to the battery H or other source of supply of electricity. The inner end of said coil of the magnet B is connected by the wire $r$ to the inner end of the coil of the magnet B', the outer end of said latter coil with the commutator-spring $o$ by the wire $r'$, and the commutator-spring $p$ to the opposite pole of the battery H by the wire $r^2$, thus completing the circuit of the system of magnets. The inner end of the coil $D^2$ of the armature D is connected through the wire $i'$ and spring-plate $i$ to the contact-ears $k$ and $l$. The inner end of the coil $D^3$ of the armature D' is connected through the wire $j'$ and the spring-plate $j$ to the contact-ear $m$, and the outer end of each of said armature-coils is soldered to one of its coil heads or collars $h$, and the armature-coils are thus connected through the frame of the machine with each other. The armature-circuit is rendered complete only by connection with the circuit through the magnet system, and this connection is made by the contact of the springs $o$ and $p$, respectively, with the contact-ears $m$ and $k$ or $l$ and $m$, said springs $o$ and $p$ being alternately curved in opposite directions by the vibratory movements of said contact-ears due to the vibrations of the armature-carrying lever C', by which said contact-ears are carried. If permanent magnets are used, the magnet-coils shown in the drawings will be omitted, and the electric circuit will be from one pole of the battery to the spring $o$, through the contact-ear $m$ to the inner end of the coil $D^3$, through said coil, through the frame of the machine to the outer end of the coil $D^2$, through said coil, and thence through the contact-ear $k$ to the spring $p$, and thence to the other pole of the battery.

It will be seen that the non-magnetic filling-pieces between the upper and lower ends of the pole-pieces N, N', S, and S', are made of different widths, and as a consequence the upper and lower ends of said pole-pieces are at different distances apart, the object of which is to increase the stroke or length of movement of the armature by virtue of the fact that when one armature has reached the point on the magnet which is attracting it, where its movement in that direction would naturally cease, the opposite magnet has just reached the point where the magnet toward which it is being attracted is exerting its greatest attracting force thereon, and thereby compels said armature to move through a greater stroke than it otherwise would.

What we claim as new, and desire to secure by Letters Patent of the United States, is—

1. In an electric apparatus, the combination of a system composed of two or more magnets, permanent or electro, and another system composed of a like number of soft-iron armatures wound with suitable conducting-coils, the members of one system being arranged to rock or roll upon or in contact with the members of the other system, and to be so moved relative thereto that each member of both systems is constantly exerting both an attracting and a repelling force, substantially as and for the purposes described.

2. The combination, in an electric apparatus, of two soft-iron armatures provided with suitable conducting-coils, and arranged upon opposite sides of and adapted to rock or roll partially about a common axis, and two magnets, permanent or electro, having their pole-pieces arranged in opposition to each other, and shaped to permit said armatures to rock or roll in contact therewith, substantially as and for the purposes described.

3. The combination, in an electric apparatus, of two magnets arranged with their poles in opposition to each other, and two armatures, each provided with a coil of conducting-wire, and arranged to rock or roll bodily from one magnetic field to another, and to come in close contact with said magnets, one armature moving toward one magnet while the other armature is moving toward the other magnet, substantially as described.

4. In an electric apparatus, the combination of two magnets arranged with their poles in opposition to each other, an armature arranged to rock or roll bodily from one magnet to another and to come in close contact therewith, and a frame or lever arranged to be moved by the rolling contact therewith of said armature in passing from one magnet to the other, substantially as and for the purposes described.

5. The combination of the magnets B and B', provided with the curved pole-pieces N, N', S, and S', the levers C and C', and the armatures D and D', mounted in opposite ends of the levers C and C', and arranged to rock or roll in contact with the opposite ends of said pole-pieces, substantially as described.

6. The combination of a lever or frame carrying an armature arranged to rock or roll from one magnetic field to another, two or more contact-ears mounted upon and adapted to move with said lever or frame, but insulated therefrom, and one or more commutator-springs firmly secured at both ends to fixed supports, and adapted to be alternately curved in opposite directions by the movement of said contact-ears, substantially as described.

7. The combination of two magnets arranged with their poles in opposition to each other, one or more armatures arranged to rock or roll from one magnetic field to another, and one or more springs arranged to press said armature into close contact with the poles of the magnets and with the non-magnetic filling-pieces, substantially as described.

8. The combination of two magnets arranged with their poles in opposition to each other, two armatures arranged to rock or roll from one magnetic field to another, and non-magnetic pole-separating pieces of different widths, arranged and adapted to operate substantially as and for the purposes described.

In testimony whereof we have signed our names to this specification, in the presence of two subscribing witnesses, on this 13th day of January, A. D. 1883.

CHARLES C. PECK.
WM. H. CHAPMAN.

Witnesses:
  E. A. HEMMENWAY,
  WALTER E. LOMBARD.